United States Patent
Dawes et al.

(10) Patent No.: US 7,123,589 B1
(45) Date of Patent: Oct. 17, 2006

(54) METHOD FOR DETERMINING THE DELAY AND JITTER IN COMMUNICATION BETWEEN OBJECTS IN A CONNECTED NETWORK

(75) Inventors: Nicholas W. Dawes, Ottawa (CA); Michael Slavitch, Ottawa (CA); Arvind Ramaswamy, Ottawa (CA)

(73) Assignee: Peregrine Systems, Inc., San Diego, CA (US)

( * ) Notice: Subject to any disclaimer, the term of this patent is extended or adjusted under 35 U.S.C. 154(b) by 1072 days.

(21) Appl. No.: 09/599,963

(22) Filed: Jun. 23, 2000

(30) Foreign Application Priority Data

Nov. 18, 1999  (CA) .................................. 2290016
May 9, 2000   (CA) .................................. 2307911

(51) Int. Cl.
   *H04J 1/16* (2006.01)
(52) U.S. Cl. ....................... 370/248; 370/252
(58) Field of Classification Search ................ 370/229, 370/230, 235, 242, 248, 250, 252, 389, 392, 370/400
See application file for complete search history.

(56) References Cited

U.S. PATENT DOCUMENTS

| | | | | |
|---|---|---|---|---|
| 4,569,042 A | * | 2/1986 | Larson ........................ | 370/250 |
| 5,521,907 A | * | 5/1996 | Ennis et al. ................. | 370/253 |
| 5,668,800 A | * | 9/1997 | Stevenson ................... | 370/248 |
| 5,710,760 A | * | 1/1998 | Moll ........................... | 370/249 |
| 5,771,274 A | * | 6/1998 | Harris ......................... | 370/242 |
| 5,812,528 A | * | 9/1998 | VanDervort ................. | 370/235 |
| 5,881,051 A | * | 3/1999 | Arrowood et al. .......... | 370/248 |
| 6,023,455 A | * | 2/2000 | Takahashi ................... | 370/249 |
| 6,212,171 B1 | * | 4/2001 | LaFollette et al. .......... | 370/257 |
| 6,405,337 B1 | * | 6/2002 | Grohn et al. ................ | 714/749 |

* cited by examiner

*Primary Examiner*—Andy Lee
(74) *Attorney, Agent, or Firm*—John A. Merecki; Hoffman, Warnick & D'Alessandro, LLC

(57) ABSTRACT

Methods which determine network performance by determining not only the transit delay between nodes in a network but also the variance, or jitter, of such transit delays. A common node, usually a network management computer (NMC), sends out a signal to a first node of interest and measures the time before it receives an acknowledgment from the first node. The NMC then sends out a similar signal to a second node of interest and similarly measures the time required to receive an acknowledgment. Based on these two measurements, the transit delay between the first and second nodes can be calculated if the first node lies on the path between the NMC and the second node or vice versa. For a multiple node communications path, the total transit delay between any two nodes is the sum total of the transit delays between adjacent nodes lying on the path. In the case of meshed networks, where a path to a node may be ambiguous, additional measurement nodes strategically positioned in the network can be used such a way that the transit delay between any adjacent pair of nodes can be calculated unambiguously from at least one of these measurement nodes, i.e., the portion of the network being measured will be reduced to a hierarchical one with respect to at least one of the measurement nodes.

16 Claims, 2 Drawing Sheets

METHOD FOR DETERMINING THE DELAY AND JITTER IN COMMUNICATION BETWEEN OBJECTS IN A CONNECTED NETWORK

FIELD OF THE INVENTION

The invention relates to networking technology and more specifically, to methods for determining network performance.

BACKGROUND TO THE INVENTION

A communications network is increasingly becoming the foundation upon which many applications and services are built. The classic example of such a popular communications network is the Internet upon which, among other things, a whole new field of business termed e-commerce is based. Even within a local environment, a communications network is used for applications such as electronic mail for the dissemination of information within an organization. The quality of applications and services running over these networks is dependent on the quality of service provided by the underlying networks. This creates a need for automatic methods of measuring a network's quality. One such measure of the quality of a network is the delay in communication between a pair of devices in the network. Another measure is jitter—this measures the variance of this delay. Depending on the application, either delay measurements or jitter measurements or both may be of interest. For example, in Voice over IP (Internet Protocol) applications, not only is delay important but jitter as well—two users communicating by voice over the network should not experience a lag in communication, nor should they experience abrupt pauses in their conversation. Methods which perform these measurements can be used by a network administrator who is interested in evaluating or monitoring a network to ensure it meets the criteria for the deployment of an application over the network.

Ideally, such measurements are made remotely or from a specific fixed node in the network. This avoids the need for each node in the network to measure its own performance. Such individual piecemeal measurements would contribute to a degradation of network performance and potentially adversely affect the measurement results.

One tool which can be of use in performing such measurements is the topology of the network. Methods of determining the topology of a network are known in the art such as that described by Dawes et al in U.S. Pat. No. 5,933,416 and U.S. Pat. No. 5,926,462.

Accordingly, there is a need for methods which can be used to automatically measure network performance. Ideally, such methods would take advantage of the knowledge of the topology of the network.

SUMMARY OF THE INVENTION

The present invention includes methods which determines network performance by determining not only the transit delay between nodes in a network but also the variance, or jitter, of such transit delays. A common node, usually a network management computer (NMC), sends out a signal to a first node of interest and measures the time before it receives an acknowledgment from the first node. The NMC then sends out a similar signal to a second node of interest and similarly measures the time required to receive an acknowledgment. Based on these two measurements, the transit delay between the first and second nodes can be calculated if the first node lies on the path between the NMC and the second node or vice versa. For a multiple node communications path, the total transit delay between any two nodes is the sum total of the transit delays between adjacent nodes lying on the path. The method also determines the processing overhead delay of a communication path between any two adjacent nodes by subtracting a previously recorded minimum transit delay for the communication path with the current interim transit delay. It follows that the total processing overhead time for a multiple node path would be the sum of the processing overhead delays for each path.

In the case of meshed networks, where a path to a node may be ambiguous, additional measurement nodes strategically positioned in the network can be used in such a way that the transit delay between any adjacent pair of nodes can be calculated unambiguously from at least one of these measurement nodes, i.e., the portion of the network being measured will be reduced to a hierarchical one with respect to at least one of the measurement nodes.

In a first embodiment, the invention provides a method of determining a transit delay between a first node and a second node in a hierarchical segment of a network connected to both the first node and the second node, the method comprising:

a) sending a first signal from a common node to the first node;
b) receiving a first response signal at the common node from the first node in response to the first signal;
c) determining a first round trip time, the first round trip time being the time elapsed between steps a) and b);
d) sending a second signal from the common node to the second node;
e) receiving a second response signal at the common node from the second node in response to the second signal;
f) determining a second round trip time, the second round trip time being the time elapsed steps d) and e); and
g) calculating the transit delay between the first node and the second node according to the formula $$D(X,Y) = |R(NMC,X) - R(NMC,Y)|/2$$

where
  $D(X,Y)$ is the transit delay between first node X and second node Y;
  $R(NMC,X)$ is the first round trip time;
  $R(NMC,Y)$ is the second round trip time; and
  NMC is the common node.

In a second embodiment, the invention provides a method of determining a total transit delay between a start node and an end node in a network the method comprising:

a) determining interim transit delays between adjacent nodes in a communications path between the start node and the end node; and
b) calculating the total transit delay between the start node and the end node by adding up the interim transit delays. In the case where multiple paths may exist between the start node and the end node, separate total transit delays will be associated with each possible path.

In a third embodiment, the invention provides a method of determining the quality of communications between two nodes in a network, the method comprising:

a) measuring a transit delay between the two nodes at different times resulting in a plurality of transit delay measurements;

b) calculating the jitter among the plurality of time delay measurements; and c) determining if the jitter exceeds a predetermined threshold value.

In a fourth embodiment, a method of determining a jitter between two transit delay measurements between two nodes, the method comprising:

calculating the jitter based on $$J(A,D,t)=D(A,D,t_2)-D(A,D,t_1))$$

where

J(A,D,t) is the jitter between the two transit delay measurements;

$D(A,D,t_1)$ is one of the two transit delay measurements taken at time $t_1$;

$D(A,D,t_2)$ is the other of the two transit delay measurements taken at time $t_2$; and A and D are the two nodes between which the transit delay is measured.

In a fifth embodiment the invention provides a method of determining a total jitter between a start node and an end node in a network, the method comprising:

a) determining interim jitters in transit delays between adjacent nodes in a communications path between the start node and the end node;

b) calculating the total jitter in transit delays between the start node and the end node by adding up the interim jitters.

In a sixth embodiment the invention provides a method of determining a jitter between a plurality of transit delay measurements between two nodes, the method comprising:

calculating the jitter based on $$J(A,B) = \frac{\sqrt{\sum_{i=1}^{M} D(A,B,i)^2}}{\sum_{i=1}^{M} D(A,B,i)}$$

where

J(A,B) is the jitter between the plurality of transit delay measurements;

D(A,B,i) is the $i^{th}$ transit delay measurement among the plurality of transit delay measurements; and M is the number of transit delay measurements.

In a seventh embodiment the invention provides a method of determining a signal processing time in a node, the method comprising:

a) determining at least one round trip delay time of a transmission between a node A and a node K;

b) determining a round trip delay time of a transmission between a node B and a node K;

c) determining a lowest recorded value for the round trip delay time between node A and node K;

d) calculating the signal processing time through node A according to:

$$P(A)=R(K,B)-\text{minimum }(R(K,A))$$

where

P(A) is the signal processing time through node A;

R(K,B) is a round trip delay time between node B and node K; and (minimum (R(K,A)) is the lowest recorded value for the round trip delay time between node A and node K.

In an eighth embodiment the invention provides a method of determining a total processing overhead delay between a start node and an end node in a network, the method comprising: a) determining interim processing overhead delays between adjacent nodes in a communications path between the start node and the end node including the following steps: a1) sending a first signal from a common node to the first node; a2) receiving a first response signal at the common node from the first node in response to the first signal; a3) determining a first round trip time, the first round trip time being a time elapsed between steps a1) and a2); a4) sending a second signal from the common node to the second node; a5) receiving a second response signal at the common node from the second node in response to the second signal; a6) determining a second round trip time, the second round trip time being a time elapsed between steps a4) and a5); and a7) calculating the transit delay between the first node and the second node according to the formula D(X,Y)=|R(NMC,X)−R(NMC,Y)|/2 where D(X,Y) is the transit delay between first node X and second node Y; R(NMC,X) is the first round trip time; R(NMC,Y) is the second round trip time; and NMC is the common node; wherein the first node and the second node are adjacent nodes; a7) subtracting a previously determined minimum transit delay between the first node and the second node with the transit delay between the first node and the second node; and b) calculating the total overhead processing delay between the start node and the end node by adding up the interim processing overhead delays.

BRIEF DESCRIPTION OF THE DRAWINGS

A better understanding of the invention may be obtained by reading the detailed description of the invention below, in conjunction with the following drawings, in which:

FIG. 1 is a topology of a portion of a network showing the connections between different nodes; and FIG. 2 is a topology of a portion of a hierarchical network showing the connections between different nodes.

DESCRIPTION OF THE PREFERRED EMBODIMENT

Figures 1, 2:
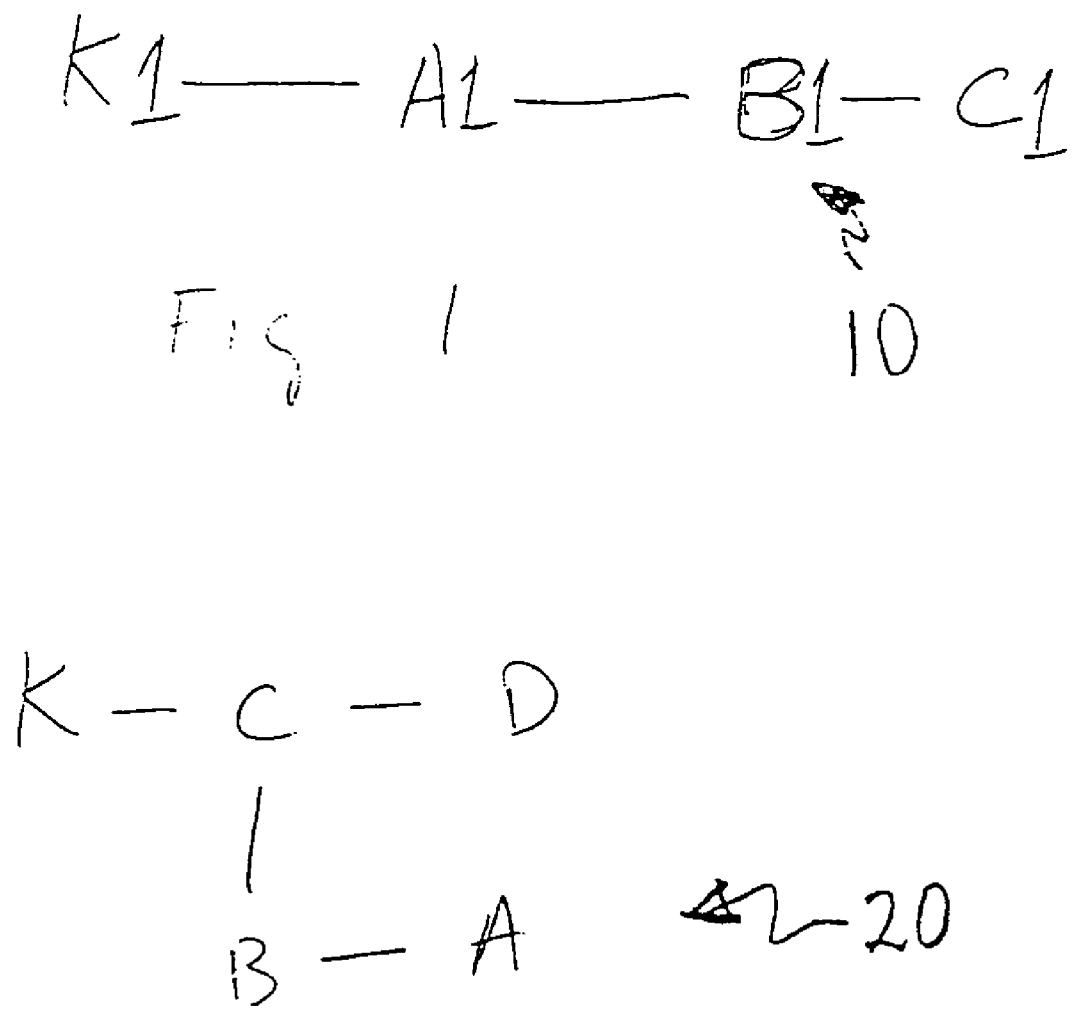
Figure 3:
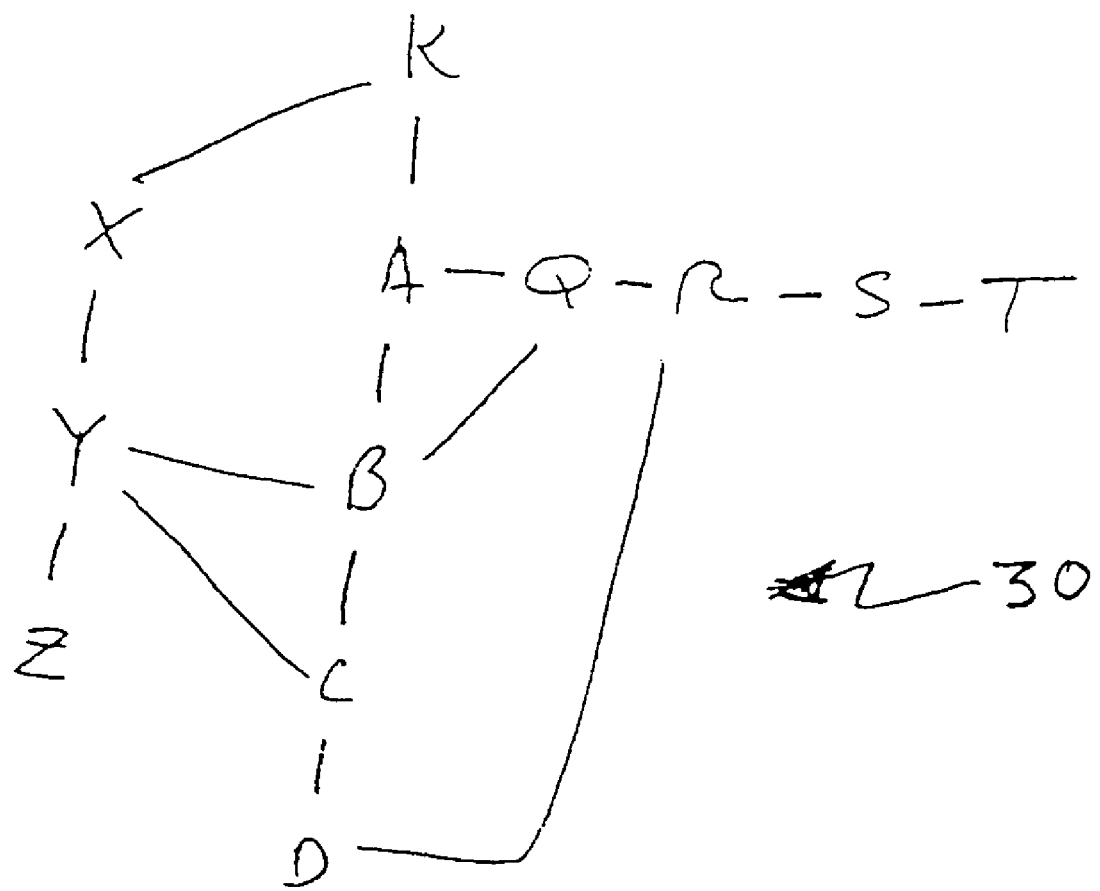
FIG. 3 is a topology of a mesh network showing the connections between different nodes.

Referring to FIG. 1, a sample network 10 consisting of nodes K1, A1, B1, C1 is illustrated. In executing the following methods, it is preferred that the topology of the network be known. U.S. Pat. Nos. 5,933,416 and 5,926,462 disclose such methods for determining a network topology. These methods are well suited for practitioners of the current invention.

To determine the transit delay between two nodes, a first node A1 and a second node B1, using a common node K1, which functions as a standard reference node from which all measurements are taken a number of assumptions can be made for simplicity.

Let R(K1, A1, t) be the round trip delay from the reference point K1 to the node A1 measured at time t.

It is assumed that the delays are symmetric, i.e., that the delay from a device K1 to a node A1 is the same as the delay from node A1 to node K1.

Thus, $$D(K1, A1, t)=D(A1, K1, t)$$

where D(K1, A1, t) is the delay between a signal leaving node K1 directed towards node A1 and the same signal being received at A1.

From the above assumption, $$D(K1, A1, t)=R(K1, A1, t)/2$$

Now let there exist a device B1 in the network such that device A1 lies on the path from K1 to B1. This network is illustrated in FIG. 1.

Thus, $$D(K1,B1,t)=D(K1,A1,t)+D(A1,B1,t)$$

$$\text{i.e. } D(A1,B1,t)=D(K1,B1,t)+D(K1,A1,t)=(R(K1,B1,t)-R(K1, A1,t))/2$$

If the path from A1 to C1 leads through B1, then $$D(A1,C1,t)=D(A1,B1,t)+D(B1,C1,t) \qquad (1)$$

This means that the delay between A1 and C1 is the sum of the interim delays between adjacent nodes on the path from A1 to C1. Thus, the delay between A1 and B1 (D(A1,B1,t) added to the delay between B1 and C1 (D(B1, C1,t)) is the total delay between A1 and C1. We can find the delay between A1 and B1 using the above formula and we can similarly find the delay between B1 and C1 using similar techniques.

We can therefore find the delay between a pair of nodes A1 and C1 based on measurements taken from a common node K1.

From the above, the transit delay between any two nodes in a network can thus be found using measurements made from a common node.

It should be noted that the method outlined above is best suited for hierarchical networks. Such a hierarchical network is illustrated in FIG. 2. In hierarchical networks, there is only one path from one node to another. Thus, as can be seen from FIG. 2, in the network 20, the only path from node A to node D is through nodes B and C.

However, it should also be noted that the method above can be adapted for use with mesh networks such as network 30 shown in FIG. 3. The network in FIG. 3 is not a hierarchical network in that multiple paths are possible between two nodes. For example, the path from node K to node R can be through the nodes K, A, Q and R or through the nodes K, A, B, Q, R, or through the nodes K, A, B, C, D and R.

To determine the delay between nodes K and R, we know from the above that this delay is the sum of the interim delays between adjacent nodes which are in the path from node K to R. Thus, once the delays between such adjacent nodes are determined, the delay between nodes K and R, via a certain path, can easily be found. To find such interim delays between adjacent nodes, measurements of transit delay can be made from different common nodes. In FIG. 3, any of the nodes can be used as a common node from which delay measurements are made. Suitable combinations of node pairs can be used to determine the transit delay between nodes. Since the topology of the network is known, this would simply be a matter of choosing which nodes to combine. Thus, again using FIG. 3, the delay between nodes A and Q can easily be determined as they are adjacent and directly connected nodes. The same can be said for node pairs Q-R, B-Q and D-R. So, to find the delay between nodes K and R, using a path which goes through nodes A and Q, would be a matter of adding the transit delay between nodes K-A, A-Q and Q-R.

It can therefore be seen that any suitable sized portion of a network is a hierarchical network. While the network of FIG. 3 is a mesh network as a whole, portions are hierarchical. Two directly connected adjacent nodes are the smallest hierarchical network. Thus, the subnetwork comprising nodes T, S and R is a hierarchical subnetwork arm of the mesh network. Similarly, subnetwork Q-B is hierarchical along with subnetwork X, Y and Z.

By subdividing a mesh network into smaller hierarchical subnetworks and moving the common or reference node to nodes within such subnetworks, the method above is clearly applicable to mesh networks. Iterative application of the above method to the hierarchical subnetworks eventually results in the measurement of transit delay between adjacent nodes.

Ideally, the signal sent from the common node, usually a network management computer (NMC) to a node being queried is one that does not require extensive processing time at the node being queried. This signal can be a ping or its equivalent which, when sent from a device A to device B, should result in a corresponding reply signal being sent from device B to device A. The corresponding reply signal need not be similar to the original signal received by B.

In cases where the processing time at a node is appreciable, it is assumed that this time is a constant and is adjusted for in delay calculations concerning that node. The round trip delay of the signal sent from the common node to adjacent nodes is a portion of the time taken at the nodes to respond to the query. The time taken by adjacent nodes may include the time the data waits in the queue of a device at the node before being transmitted and the time to process the data at the other end after being received. Thus, the total time taken for adjacent nodes to respond to the query is referred to as the processing overhead time. We outline below one way of determining this processing overhead time:

Consider two adjacent nodes A1 and B1 which are connected such that the path to B1 from the NMC, K1, goes through A1 as in FIG. 1. Let R(K1, B1) and R(K1, A1) be the round trip delays to nodes B1 and A1 from K1 respectively. If, at any given time, R(K1, B1) is less than the minimum ever recorded value of R(k1, A1) then this discrepancy is attributed to the extra processing time at node A1 and hence we deduce the processing time of A1, P(A1), as $$P(A1)=R(K1,B1)-\text{minimum}(R(K1,A1))$$

This processing time is then subtracted from all delay calculations involving node A1. For example:

$$R(K1,A1)=R(K1,A1)-P(A1)$$

Referring again to FIG. 3, there may be multiple paths available for signal routing between a start node and an end node. As one object of the present invention is to determine the processing overhead time for a given communication path, present invention can circumvent any ambiguities in the topology of the network prior to querying the nodes along the communication path. Alternatively put multiple queries, or pings, are sent from the common node to the first node, from the common node to the second node and so on and so forth to the end node, prior to determining the specific topology of that communication path. The communication path is taken into account after the queries are sent. Thus, the method of the present invention differs significantly from the prior art, as disclosed in U.S. Pat. No. 5,563,875, wherein pre-calculated routes are required to send "wrap-around" test messages to each node in the pre-calculated route.

To determine the variance or jitter in transit delay between nodes, multiple determinations of transit delay between two nodes need to be made. Once this data is collected, variance or jitter can be found.

Even with this assumption, we can still generalize jitter calculations. We can compute the jitter J(A, C) between nodes A and C over M samples of D(A, C, t). When M=2, we compute the instantaneous jitter J(A, C) as $$J(A, C) = D(A,C,t_2) - D(A,C,t_1) \quad (2)$$

where time t2>t1. In this case, we preserve the sign or direction of change in transit delay.

In the case of M samples where M>2, we compute the jitter as the variance over the M samples using the formula:

$$J(A, C) = \frac{\sqrt{\sum_{i=1}^{M} D(A, C, i)^2}}{\sum_{i=1}^{M} D(A, C, i)} \quad (3)$$

As an example, a portion of a network with a topology as shown in FIG. 2 can be used. In this network, node K is the reference point (or the NMC) and we want to compute the delay and the jitter in the communications path A-D.

Let the NMC (node K) send signals to nodes A, B, C and D at times $t_1$ and $t_2$ and obtain the following round trip values (all in milliseconds). (Note: It is assumed that time $t_2 > t_1$)

|            | time $t_1$ | time $t_2$ |              |
|------------|------------|------------|--------------|
| R(K, A, t) = | 9.2        | 9.8        | milliseconds |
| R(K, B, t) = | 7.6        | 6.8        | milliseconds |
| R(K, C, t) = | 3.4        | 3.2        | milliseconds |
| R(K, D, t) = | 4.6        | 4.8        | milliseconds | where, as above, R(A,B,t) is the total time elapsed between node A sending a signal to node B at time t and node A receiving a corresponding signal from node B where the corresponding signal is sent by B only after the receipt of the original signal from node A.

Then the following values can therefore be found (again using the notation introduced above and from (1)):

$$D(B,A,t_1) = (9.2-7.6)/2 = 0.8 \text{ ms}$$

$$D(C,B,t_1) = (7.6-3.4)/2 = 2.1 \text{ ms}$$

$$D(C,D,t_1) = (4.6-3.4)/2 = 0.5 \text{ ms}$$

Therefore, the delay between node A and D can be found as:

$$D(A,D,t_1) = D(B,A,t_1) + D(B,C,t_1) + D(C,D,t_1)$$

$$= 0.8 + 2.1 + 0.5$$

$$= 3.4 \text{ ms}$$

For time $t_2$, similar calculations can be carried out:

$$D(B,A,t_2) = (9.8-6.8)/2 = 1.5 \text{ ms}$$

$$D(C,B,t_2) = (6.8-3.2)/2 = 1.8 \text{ ms}$$

$$D(C,D,t_2) = (4.8-3.2)/2 = 0.8 \text{ ms}$$

A second total transit delay between nodes A and D is therefore:

$$D(A,D,t_2) = D(B,A,t_2) + D(B,C,t_2) + D(C,D,t_2)$$

$$= 1.5 + 1.8 + 0.8$$

$$= 4.1 \text{ ms}$$

We can now estimate jitter in the path A-D as (from (2))

$$J(A,D) = (D(A,D,t_2) - D(A,D,t_1))$$

$$J(A,D) = 0.7 \text{ ms}$$

The above jitter calculations are based on two transit delay measurements. However, long term jitter or variance in transit delay between two nodes can easily be found using well known statistical methods. Such variance, whether long term or between two measurements, can be used as a measure of the quality of communications between two nodes.

Because the variance is essentially a measure of the extent a transit delay may deviate from the mean transit delay, by comparing this variance with a predetermined threshold, one can measure how bad the delay can be. If the application being used on the network cannot tolerate a specific maximum transit delay or a specific maximum jitter, then the network is not suitable for this application. Alternatively, as long as the network is operating within set parameters, as measured by the transit delays and jitter, the network can be considered healthy. If the transit delays or the jitter measurements do not meet a predetermined threshold, an alarm can be indicated to thereby alert the network operators that problems in the network performance need to be addressed.

The above methods can be run as a software module within a main software process residing on a Network Management Computer (NMC) that executes the methods described in U.S. Pat. Nos. 5,933,416 and 5,926,462. This main process receives information about the devices in the network from a second software process, which periodically gathers information directly from the devices or nodes in the network. The main process uses this information to construct the physical topology of the network. A software module is then used to periodically send signals to the devices in the network and to accurately record the associated round trip delays. The signal used here is the 'ping' operation. The processing time for this operation is negligible (or constant) with respect to the transmission times over the network between the NMC and the node. This information is passed on to the main process which uses it in conjunction with the physical topology of the network to compute delays on a device as described above. For every node A being monitored, the main process would compute delays D(A,B) and D(C,A) where B and C are nodes that are directly connected to A, i.e., if a graph is used to represent nodes and edges represent direct physical connections between devices, B and C would be adjacent nodes to A with edges between B and A and C and A.

D(A,B) and D(C,A) are computed for every device A being monitored by the main software process. These calculations are stored in an internal device database as will as a statistical database. The internal device database stores the most recent D(A,B) values for a device whereas the statistical database stores the history of D(A,B) values over a period of time. Average D(A,B) values for 5-minute and 1-hour intervals over the previous two days and 1-day intervals for older samples are stored in the statistical database.

Instantaneous jitter values J(A,B) (between two consecutive delay samples) are also computed, along with simple statistical measures over them such as the minimum, maximum and average, and stored in the two databases as described above for D(A,B). Long term jitter is not stored explicitly in the database but rather computed on demand from the D(A,B) values stored in the statistical database. These values of J(A,B) and D(A,B) are read in by a third software process which produces reports. These values can be used to generate alarms based on comparisons with user specified alarm thresholds. These values can be graphically displayed such as, for a certain threshold, all points in the network where the jitter and delay exceed the threshold are highlighted in a certain colour on a graphical map displaying the topology of the network. The user can change thresholds and at a glance, see the non-conforming portions of his network.

The user may also specify two devices A and B (not necessarily connected directly to each other) over which the user would like to see delays D(A,B) and jitters J(A,B) computed and alarmed. This is very useful in identifying the total delay and jitter experienced by a user on device A who is sending signals to device B. Since applications usually specify minimum requirements for acceptable service in terms of the end nodes involved in the application, the above calculation becomes essential.

A person understanding the above-described invention may now conceive of alternative designs, using the principles described herein. All such designs which fall within the scope of the claims appended hereto are considered to be part of the present invention.

We claim:

1. A method of determining a total processing overhead delay between a first node and a second node in a network connected to both the first node and the second node, the method comprising:
   a) determining interim transit delays processing overhead delays between adjacent nodes in a communications path between the start node and the end node including the following steps:
      a1) sending a first signal from a common node to the first node;
      a2) receiving a first response signal at the common node from the first node in response to the first signal;
      a3) determining a first round trip time, the first round trip time being a time elapsed between steps a) and b);
      a4) sending a second signal from the common node to the second node;
      a5) receiving a second response signal at the common node from the second node in response to the second signal;
      a6) determining a second round trip time, the second round trip time being a time elapsed between steps d) and e); and
      a7) calculating the transit delay between the first node and the second node according to the formula $D(X,Y)=|R(NMC,X)-R(NMC,Y)|/2$ where
         D(X,Y) is the transit delay between first node X and second node Y;
         R(NMC,X) is the first round trip time;
         R(NMC,Y) is the second round trip time; and
         NMC is the common node;
      a8) subtracting a previously determined minimum transit delay between the first node and the second node with the transit delay between the first node and the second node; and
   b) calculating the total transit overhead processing delay between the start node and the end node by adding up the interim transit processing overhead delays.

2. A method as in claim 1 wherein at least one of the first and second nodes are directly connected to the common node.

3. A method as in claim 1 wherein at least one of the first and second nodes are indirectly connected to the common node.

4. A method of determining the quality of communications between two nodes in a network, the method comprising:
   a) measuring a transit delay between the two nodes at different times resulting in a plurality of transit delay measurements;
   b) calculating a jitter among the plurality of time delay measurements based on measuring a variance of the plurality of transit delay measurements; and
   c) determining if the jitter exceeds a predetermined threshold value.

5. A method as in claim 4 wherein the network is a hierarchical network and the transit delay is measured between a first node and a second node using the following method:
   a) sending a first signal from a common node to the first node;
   b) receiving a first response signal at the common node from the first node in response to the first signal;
   c) determining a first round trip time, the first round trip time being a time elapsed between steps a) and b);
   d) sending a second signal from the common node to the second node in response to the second signal;
   e) receiving a second response signal at the common node from the second node in response to the second signal;
   f) determining a second round trip time, the second round trip time being a time elapsed between steps d) and e); and
   g) calculating the transit delay between the first node and the second node according to the formula $D(X,Y)=|R(NMC,X)-R(NMC,Y)|/2$ where
      D(X,Y) is the transit delay between first node X and second node Y;
      R(NMC,X) is the first round trip time;
      R(NMC,Y) is the second round trip time; and
      NMC is the common node.

6. A method as in claim 4 wherein the transit delay is measured between a start node and an end node in a hierarchical network using the following method:
   a) determining interim transit delays between adjacent nodes in a communications path between the start node and the end node; and
   b) calculating the total transit delay between the start node and the end node by adding up the interim transit delays.

7. A method as in claim 5 wherein the hierarchical network is a portion of a mesh network.

8. A method as in claim 7 wherein the hierarchical network is a portion of a mesh network.

9. A method as in claim 4 wherein step c) includes determining if at least one of the transit delay measurements exceeds a predetermined threshold value.

10. A method of determining a jitter between two transit delay measurements between two nodes, the method comprising:
calculating the jitter based on $J(A,D,t)=D(A,D,t2)-D(A,D,t1))$ where J(A,D,t) is the jitter between the two transit delay measurements based on measuring a variance of the two transit delay measurements;

D(A,D,t1) is one of the two transit delay measurements taken at time t1;

D(A,D,t2) is the other of the two transit delay measurements taken at time t2; and A and D are the two nodes between which the transit delay is measured.

11. A method as in claim 10 wherein the two nodes are directly connected to each other.

12. A method as in claim 10 wherein the two nodes are indirectly connected to each other.

13. A method of determining a jitter between a plurality of transit delay measurements between two nodes, the method comprising:

calculating the jitter based on $$J(A,B) = \frac{\sqrt{\sum_{i=1}^{M} D(A,B,i)^2}}{\sum_{i=1}^{M} D(A,B,i)}$$

where

J(A,B) is the jitter between the plurality of transit delay measurements;

D(A,B,i) is the $i^{th}$ transit delay measurement among the plurality of transit delay measurements; and M is the number of transit delay measurements.

14. A method as in claim 13 wherein the two nodes are directly connected to each other.

15. A method as in claim 13 wherein the two nodes are indirectly connected to each other.

16. A method of determining a signal processing time in a node, the method comprising:

a) determining at least one round trip delay time of a transmission between a node A and a node K;

b) determining a round trip delay time of a transmission between a node B and a node K;

c) determining a lowest recorded value for the round trip delay time between node A and node K;

d) calculating the signal processing time through node A according to:

$P(A)=R(K,B)-\text{minimum }(R(K,A))$ where

P(A) is the signal processing time through node A;

R(K,B) is a round trip delay time between node B and node K; and (minimum (R(K,A)) is the lowest recorded value for the round trip delay time between node A and node K.

* * * * *